US 9,479,484 B2

United States Patent
Chunduri et al.

(10) Patent No.: US 9,479,484 B2
(45) Date of Patent: *Oct. 25, 2016

(54) MECHANISM FOR CO-ORDINATED AUTHENTICATION KEY TRANSITION FOR IS-IS PROTOCOL

(71) Applicant: TELEFONAKTIEBOLAGET L M ERICSSON (PUBL), Stockholm (SE)

(72) Inventors: Uma S. Chunduri, Fremont, CA (US); Wenhu Lu, San Jose, CA (US); Alfred C. Lindem, III, Cary, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/626,829

(22) Filed: Feb. 19, 2015

(65) Prior Publication Data

US 2015/0172256 A1 Jun. 18, 2015

Related U.S. Application Data

(63) Continuation of application No. 13/773,450, filed on Feb. 21, 2013, now Pat. No. 8,995,667.

(51) Int. Cl.
*H04L 29/06* (2006.01)
*H04L 12/701* (2013.01)
*H04L 12/715* (2013.01)

(52) U.S. Cl.
CPC .......... *H04L 63/0428* (2013.01); *H04L 45/00* (2013.01); *H04L 63/062* (2013.01); *H04L 63/065* (2013.01); *H04L 63/068* (2013.01); *H04L 63/08* (2013.01); *H04L 69/18* (2013.01); *H04L 45/04* (2013.01)

(58) Field of Classification Search
CPC ....................................................... H04L 9/00
See application file for complete search history.

(56) References Cited

U.S. PATENT DOCUMENTS 5,680,458 A * 10/1997 Spelman ............... H04L 9/0891
380/277
6,295,361 B1 * 9/2001 Kadansky ............... H04L 29/06
380/273

(Continued)

OTHER PUBLICATIONS

Bhatia, M. , et al., "IS-IS Generic Cryptographic Authentication", *RFC 5310*; Feb. 2009; 12 pages.

(Continued)

*Primary Examiner* — Andrew Nalven
*Assistant Examiner* — Mary Li
(74) *Attorney, Agent, or Firm* — Nicholson, De Vos, Webster & Elliot, LLP

(57) ABSTRACT

An automated key transition method is executed by a node in a network. The network includes a set of nodes utilizing a current key identifier. A key identifier specifies an authentication protocol and an authentication key for use in the authentication of intermediate-system to intermediate-system (IS-IS) protocol data units. The method includes a set of steps including receiving a message at the node, where, the message includes a most recent key identifier to replace the current key identifier, verifying whether all reachable nodes in the set of nodes have advertised the most recent key identifier, continuing authentication using the current key identifier until all reachable nodes in the set of nodes have been verified to advertise the most recent key identifier, and switching authentication at the node to use the most recent key identifier upon verification that all reachable nodes in the set of nodes have advertised the most recent key identifier.

14 Claims, 3 Drawing Sheets

(56) References Cited

U.S. PATENT DOCUMENTS

| | | | |
|---|---|---|---|
| 6,715,354 | B2 | 4/2004 | Wooh |
| 6,854,333 | B2 | 2/2005 | Wooh |
| 2002/0071430 | A1 | 6/2002 | Szyszko |
| 2006/0115089 | A1* | 6/2006 | Carter .................. H04L 9/083 380/273 |
| 2006/0190732 | A1* | 8/2006 | Fery ............... G07B 17/00733 713/176 |
| 2006/0209719 | A1* | 9/2006 | Previdi ............ H04L 12/4633 370/254 |
| 2011/0150223 | A1* | 6/2011 | Qi ........................ H04W 12/04 380/273 |
| 2011/0249817 | A1 | 10/2011 | Park et al. |
| 2012/0044947 | A1* | 2/2012 | Ward ..................... H04L 47/39 370/401 |
| 2012/0243683 | A1* | 9/2012 | Oba ..................... H04L 9/0836 380/255 |

OTHER PUBLICATIONS

Bhatia, M., et al., "IS-IS Generic Cryptographic Authentication", *Network Working Group; RFC 5310*; Feb. 1, 2009; URL:http://tools.ietf.org/pdf/rfc5310.pdf; 12 pages.

Callon, R., et al., "Use of OSI IS-IS for routing in TCP/IP and Dual Environments", *RFC 1195*; Dec. 1990; http://tools.ietf.org/rfc/rfc1195.txt; 80 pages.

Chunduri, W., et al., "IS-IS Extended Sequence No. TLV", *IS-IS Extended Sequence No. TLV; Draft-Chunduri-Isis-Extended-Sequence-No-TLV-04.txt; ISOC*; Jan. 18, 2013; pp. 1-12.

Chunduri, U., et al., "Karp IS-IS Security Gap Analysis", *Draft-Chunduri-Karp-IS-IS-Gap-Analysis-04.txt*. Jan. 17, 2013; whole document.

Chunduri, U., et al., "KARP IS-IS Security Gap Analysis draft-chunduri-karp-is-is-gap-analysis-03", Oct. 12, 2012; 13 pages.

Hartman, S., et al., "Multicast router Key Management Protocol draft-hartman-karp-mrkmp-05", Sep. 6, 2012; 27 pages.

Lebovitz, G., et al., "Keying and Authentication fo Routing Protocols (KARP) Overview, Threats, and Requirements", *Draft-IETF-KARP-THREATS-RegS-07.txt*, Dec. 20, 2012; whole document.

Li, T., "IS-IS Cryptographic Authentication", *RFC 5304*; Oct. 2008; 11 pages.

Li, T., "IS-IS Crptographic Authentication", *Draft-IETF-ISIS-HMAC-01.TXT*, Apr. 10, 2000, 11 pages.

Tran, P., et al., "The Use of G-IKEv2 for Multicast Router Key Mangement draft-tran-karp-mrmp-02", Oct. 22, 2012; 13 pages.

\* cited by examiner

MECHANISM FOR CO-ORDINATED AUTHENTICATION KEY TRANSITION FOR IS-IS PROTOCOL

CROSS-REFERENCE TO RELATED APPLICATION

The present patent application is a continuation of application Ser. No. 13/773,450, filed Feb. 21, 2013.

FIELD OF INVENTION

Embodiments of the invention are related to the field of routing protocol security. Specifically, the embodiments relate to a method and system for changing authentication keys of the security protocol without disrupting intermediate system to intermediate system (IS-IS) function.

BACKGROUND

The use of cryptographic authentication with the IS-IS protocol has been defined and periodically extended. Specifically, the IS-IS protocol was updated to enable the authentication of all IS-IS Protocol Data Units (PDUs) by including authentication information as part of the PDU. This authentication information is encoded as a Type-Length-Value (TLV) tuple. The type of this authentication information TLV is specified as 10. The length of this TLV can vary and the value of the TLV depends on an authentication algorithm to be used and similar factors. The first octet of the value of the TLV specifies the authentication type. Type 0 is reserved, type 1 indicates a cleartext password, and type 255 is used for routing domain private authentication methods. The remaining portion of the TLV value is referred to as the Authentication Value, which is a field and value to be utilized during the authentication process. Extensions to the cryptographic authentication features of IS-IS have enabled additional types of authentication, mechanisms, and processes to be utilized and standardized for use with IS-IS.

Group key management enables the definition of a chain of authentication keys to be utilized in connection with any type of authentication process. The chain defines an order of use for the authentication keys providing a defined progression of authentication keys to enhance security over a continuous use of a single authentication key. In connection with IS-IS, group key management can be utilized, but the update of the authentication keys across the nodes of a network can potentially disrupt the functioning of the IS-IS protocol during transition from an old authentication key to a new authentication key.

SUMMARY

An automated key transition method is executed by a node in a network. The network includes a set of nodes that are directly and indirectly interconnected, reachable, and utilizing a current key identifier. A key identifier specifies an authentication protocol and an authentication key for use in the authentication of intermediate-system to intermediate-system (IS-IS) protocol data units within an IS-IS network, area, or domain. The method includes a set of steps including receiving a message at the node. The message includes a most recent key field to hold a most recent key identifier to replace the current key identifier, the message indicating to replace the current key identifier with the most recent key identifier. The method further includes verifying whether all reachable nodes in the set of nodes have advertised the most recent key identifier, continuing authentication using the current key identifier until all reachable nodes in the set of nodes have been verified to advertise the most recent key identifier, and switching authentication at the node to use the most recent key identifier upon verification that all reachable nodes in the set of nodes have advertised the most recent key identifier.

A node is configured to execute an automated key transition method for a network. The network including a set of nodes that are directly and indirectly interconnected, reachable and utilizing a current key identifier. A key identifier specifies an authentication protocol and an authentication key for use in the authentication of intermediate-system to intermediate-system (IS-IS) protocol data units within an IS-IS network, area, or domain. The node comprises a network interface for sending and receiving IS-IS messages to the set of nodes via adjacent nodes in the network, and a network processor coupled to the network interface, the network processor configured to execute a local key database manager and an IS-IS module. The local key database manager is configured to receive a message having a most recent key field to hold a most recent key identifier, the message indicating to replace the current key identifier with the most recent key identifier, the IS-IS module includes an IS-IS key manager that is configured to continue authentication using the current key identifier until all reachable nodes in the set of nodes have been verified to advertise the most recent key identifier. The IS-IS key manager is further configured to verify whether all reachable nodes in the set of nodes have advertised the most recent key identifier, and to switch authentication to use the most recent key identifier upon verification that all reachable nodes in the set of nodes have advertised the most recent key identifier.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

Figure 1:
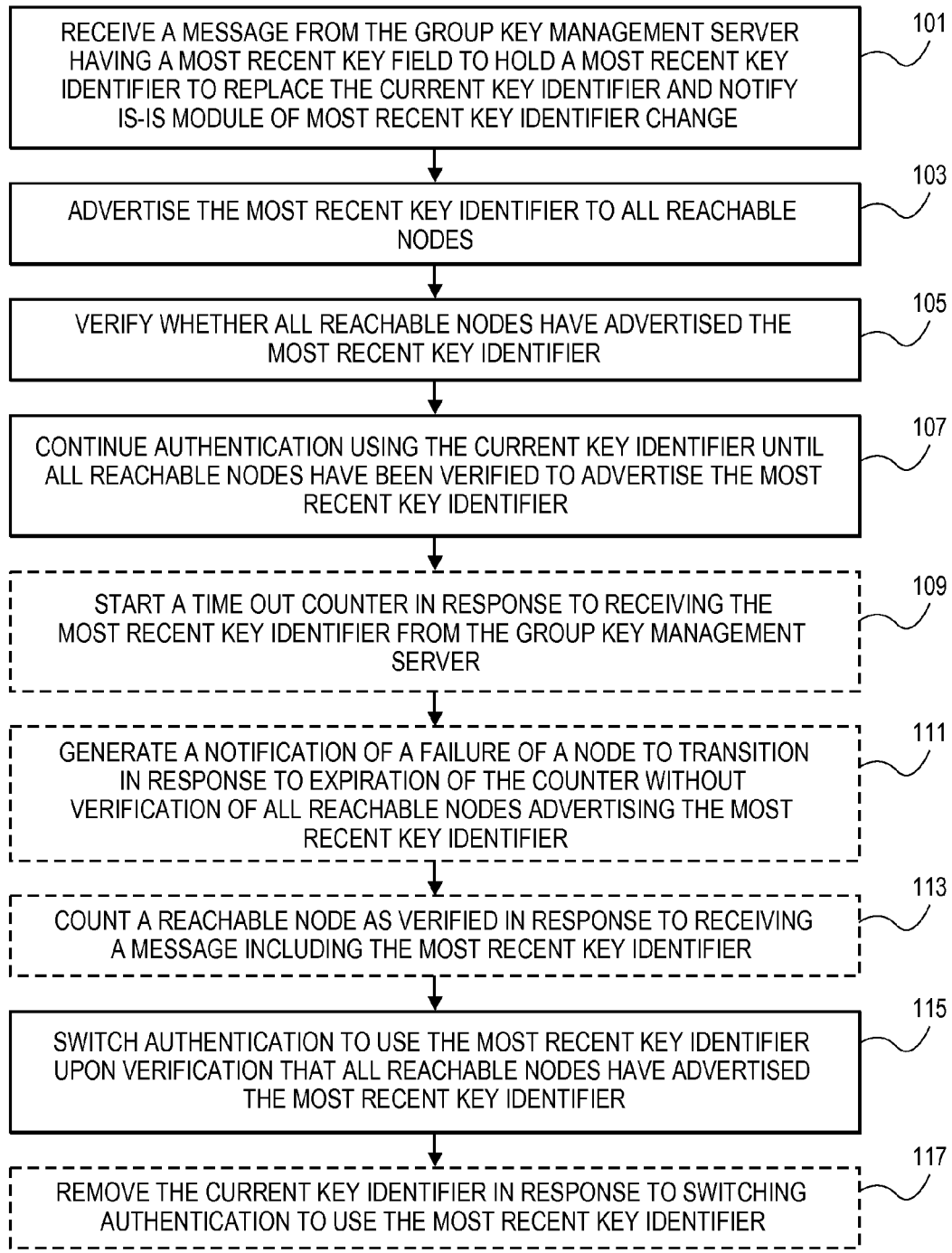
FIG. 1 is a diagram of one embodiment of a process for group authentication key transition in a network for IS-IS.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The techniques shown in the figures can be implemented using code and data stored and executed on one or more electronic devices (e.g., a sensor device, end station, a network element, server or similar electronic devices). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, or similar networking device.) is a piece of networking equipment, including hardware and software that communicatively interconnects other equipment on the network (e.g., other network elements, end stations, or similar networking devices). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data collection). In the following description and claims, the terms 'coupled' and 'connected,' along with their derivatives, may be used. It should be understood that these terms are not intended as synonyms for each other. 'Coupled' is used to indicate that two or more elements, which may or may not be in direct physical or electrical contact with each other, co-operate or interact with each other. 'Connected' is used to indicate the establishment of communication between two or more elements that are coupled with each other.

To ease understanding, dashed lines have been used in the figures to signify the optional nature of certain items (e.g., features not supported by a given implementation of the invention; features supported by a given implementation, but used in some situations and not in others).

Embodiments of the invention provide a process and system that address the problem of enabling automated authentication key transitioning as part of a group key management process thereby avoiding the need for manual key distribution for the routers. In addition, the advantages of the embodiments of the invention include that the functions of the IS-IS protocol are not impeded by a key transition, because the embodiments allow for continued functioning under a current authentication key until determining that all of the nodes are prepared to transition.

The disadvantages of the prior art include that authentication keys are not able to change without affecting any IS-IS protocol operations, in particular the functions of establishing adjacencies between nodes, control packet loss and retransmission functions, and link state packet (LSP) flooding where the flooding is held until specific authentication key identifiers have been updated across the nodes of the network. Thus, the general requirements of the network implementing the IS-IS protocol are not met when a group key management protocol is deployed.

Overview

The embodiments can be effectively used to enable key transitions in coordination with a group key management server and a group key management protocol without any significant impact to the IS-IS routing protocol operations. These embodiments are suitable to deploy with manual key deployments for effective key transitions in the entire IS-IS L1 area/L2 domain. IS-IS routers can be designated as being Level 1 (L1 intra-area); Level 2 (L2 inter-area); or Level 1-2 (L1/L2 both). Level 2 routers are inter-area routers that can only form relationships with other Level 2 routers. Routing information is exchanged between Level 2 routers and other Level 2 routers, while Level 1 routers only exchange routing information with other Level 1 routers. Level 1-2 (L1/L2) routers exchange routing information with both levels and are used to connect the inter-area routers with the intra-area routers.

The key deployments can define an IS-IS Security Association (SA). An IS-IS SA contains a set of parameters shared between any two nodes implementing the IS-IS protocol. The parameters associated with an IS-IS SA include a key identifier. The key identifier is a two-octet unsigned integer that uniquely identifies an IS-IS SA, as manually configured by the network operator. The receiver determines the active SA by looking at a key ID field in the incoming protocol data unit (PDU). The sender, based on the active configuration, selects the SA to use and inserts the correct key identifier value associated with the SA in the IS-IS PDU.

Each key identifier defines two items: an authentication protocol (also referred to as an authentication mechanism) and an authentication key. In some embodiments, a network operator or administrator is able to configure a set of keys in a key chain, with each key in the chain having a fixed lifetime. Each key identifier can indicate a key with a different authentication protocol. This allows any number of different authentication mechanisms to be used at various times without disrupting IS-IS peering. This system also supports the subsequent addition of new authentication mechanisms.

The authentication protocol or mechanism is a field that contains a value to identify the authentication algorithm to be used with the IS-IS SA. This information is not sent in cleartext over the wire. Because this information is not sent on the wire, the implementer chooses an implementation specific representation for this information. Examples of the possible values include those that represent HMAC-SHA-1, HMAC-SHA-224, HMAC-SHA-256, HMAC-SHA-384, and HMAC-SHA-512.

The authentication key is the value that denotes the cryptographic authentication key associated with the IS-IS SA. The length of this key is variable and depends upon the authentication algorithm specified by the IS-IS SA.

Most Recent Key Identifier TLV

```
 0 1 2 3 4 5 6 7 8 9 0 1 2 3 4 5
+-+-+-+-+-+-+-+-+
| Type (TBD)|
+-+-+-+-+-+-+-+-+
| Length    |
+-+-+-+-+-+-+-+-+-+-+-+-+-+-+-+-+
| MostRecentKeyID  |
+-+-+-+-+-+-+-+-+-+-+-+-+-+-+-+-+
```

In one embodiment, a new TLV (shown above) is utilized in IS-IS messages (e.g., in IIH, SNP and LSP messages) to advertise the new KeyID received from the Group Key Server (or Group key management protocol). The embodiments can be compatible with RFC 5310. In this implementation of the IS-IS protocol, a current KeyID is part of an authentication TLV as defined in Section 3.1 of RFC 5310. The new TLV, defining the most recent key identifier, can be utilized to advertise the distribution of a new key that the IS-IS area or domain is transitioning toward as defined by a group key manager, for example the next key in a key chain. Separate processes can be defined for the use IS-IS hello (IIH) messages and link state protocol (LSP)/Sequence Number PDU (SNP) messages to manage the key transition.

General Key Transition Process

FIG. 1 is a flowchart of one embodiment of a process for authentication key transition for the IS-IS protocol. The process is described as it is executed by each node in the IS-IS network or domain routed by the IS-IS protocol. In one embodiment, the authentication key transition process is initiated in response to receiving a message from the group key management server having a field, specifically a most recent key field, in which can be in any format (Block 101). The most recent key field holds an authentication key identifier that is to replace the current authentication key identifier. The node tracks and utilizes a current key identifier in IS-IS messages, which identifies the authentication key that is currently in use by the node. This current authentication key is to be replaced by the most recent authentication key that is identified by the received message from the group key management server. The most recent authentication key and the most recent authentication key identifier relate to an authentication key that is next to be utilized in the IS-IS domain and which will replace the current authentication key after the transition. Once complete, the most recent authentication key is thereafter the current authentication key and the group key management server will eventually distribute another most recent authentication key for the next transition. The group key management server can use any protocol or messaging type to distribute these authentication keys. The message containing the most recent authentication key can be received at the node by a local key database manager, which then notifies the IS-IS module of the node of the change in the authentication key.

Once the node (e.g., an IS-IS module, specifically an IS-IS key manager) has received the most recent authentication key, it sends a message to all reachable nodes with the most recent key, e.g., in a TLV or other format, thereby advertising to all the reachable nodes that the node is ready to transition to the most recent key (Block 103). The node also tracks the receipt of such advertisement messages from all the reachable nodes. The advertisement message can be any type of IS-IS message such as the use of IS-IS hello messages or by use of an LSP fragment or SNP. The node attempts to verify whether all of the reachable nodes have advertised the most recent key identifier (Block 105). Further checks can be made that the most recent key identifiers that are advertised by all the reachable nodes are identical. The node may continuously monitor and track the advertised most recent key of each reachable node, because these nodes may start advertising before the node receives the most recent key from the group key management server to avoid missing the advertisement due to such timing issues. If all of the reachable nodes are not yet advertising the most recent key identifier, then the node continues to use the current authentication key until all of the reachable nodes have been verified to advertise the most recent key identifier (Block 107).

In some embodiments, there is an option that the node will start a time out counter in response to receiving the most recent key identifier from the group key management server (Block 109). The counter can have any starting and ending value to provide any time frame for determining whether all the nodes in the network have had sufficient time to receive the most recent key, it is assumed that those nodes that have not advertised the most recent keys are not capable of updating or have similar problem and will not be able to transition. After expiration of the counter, a notification of a failure of a node to transition can be generated (Block 111). The notification can be sent to the group key management server, an administrator, or to all reachable nodes. An automated process can be defined to transition the key for all of the nodes that have advertised the most recent key and excluding the non-advertising node.

In some embodiments, a key-rollover expiration timeout is used to detect IS-IS nodes that persist advertising the old current key identifier in the MostRecentKeyID TLV or similar format after a new MostRecentKeyID has been advertised by the group management key server. In this situation, the network operator can be alerted for manual intervention. After expiration, local policy will determine whether the key-rollover occurs independent of the IS-IS node(s) advertising the old current key-identifier in the MostRecentKeyID TLV (or similar format) or whether the key-rollover is delayed until the problem is resolved. Similarly, for backward compatibility, the key-rollover expiration timeout can be used to determine whether legacy IS-IS nodes that are not advertising the MostRecentKeyID TLV (or similar format) have a high probability of having the new key and being ready for key-rollover.

In one optional embodiment, the node is counted as a verified reachable node in response to receiving other types of messages that contain the most recent key as the current key indicating that the sending node has already transitioned to the use of the most recent key (Block 113). In some cases the advertisement messages may have been missed, or a node that has transitioned may not have implemented the transition protocol. However, since this node already transitioned, the transition process can continue in the other nodes in the network without having to wait further for this transitioned node.

After all of the reachable nodes have been verified as having advertised the most recent key (or have already transitioned), the node can switch the authentication process to use the most recent key identifier (Block 115). The verification that all nodes have received the most recent key ensures that the use of the most recent key can be handled by all of the reachable nodes in the IS-IS network. As each of the nodes in the network are able to verify that all the reachable nodes in the network have the most recent key, they will also each transition to the use of the most recent key, thereby completing the transition of all nodes to the most recent key without disruption to the IS-IS protocol function in the network (Block 117). The switch can coincide with the replacement of the current key identifier with the most recent key identifier. The current key identifier can be preserved for any duration after being replaced, using any other designation such as former key identifier, which can be used in cases where older messages using the former key identifier are still utilized. The former key identifier can be discarded on the next transition or after a defined interval.
IIH Procedure In one embodiment, the advertising message for the authentication key transition can be an IS-IS hello (IIH) message. When IIH messages are utilized, initially a current key identifier (ID) in the authentication TLV (TLV 10 as defined in RFC 5310) is the same as "MostRecentKeyID" in the new TLV defined herein for IIH messages. When the group key management server or similar central entity assigns or generates a new key, this new key would be updated by all the nodes in the broadcast network in the next IIH message (i.e., the initial CurrentKeyID is still the old value). Each node, after receiving the MostRecentKeyID, will switch to the MostRecentKeyID for IIH messages after verifying all reachable nodes have advertised the new MostRecentKeyID in the broadcast network.

While continuing to receive IS-IS messages, the authentication is still performed based on the CurrentKeyID in the authentication TLV (TLV 10). The old CurrentKeyID is removed or no longer used only after all reachable nodes make the CurrentKeyID=MostRecentKeyID (to accommodate slow transitioning of nodes in the network). This new TLV is applicable for each interface if each interface in the broadcast domain has different keys (i.e., dependent on the scope of the IIH).

LSP/Sequence Number Packets (SNPs) Procedure:

In another embodiment, the message advertising the authentication key transition is an LSP fragment or SNP. When an LSP is utilized, initially the CurrentKeyID in the authentication TLV (TLV 10-RFC 5310) is the same as "MostRecentKeyID" in the new TLV, defined herein for all LSP fragments/SNPs sent by a node in an L1 area or L2 Domain. When the group key management server or some other central entity provides a new key to the nodes of the network, this new TLV would be updated by all the nodes in the L1 area or L2 domain by generating an LSP-0 with a new sequence number (i.e., here the CurrentKeyID is still the old value). The sender of LSP fragments then switch to utilize MostRecentKeyID after noticing all reachable nodes have advertised the new MostRecentKeyID in LSP-0 of the L1 area or L2 Domain as applicable. On broadcast networks, the sender of the SNP (e.g., either CSNP/PSNP) should similarly make sure that all nodes in the same broadcast scope advertised the new MostRecentKeyID in LSP-0 of the L1 area or L2 Domain before switching to the same. While the transition is in process, the received IS-IS message authentication is still performed based on the CurrentKeyID in authentication TLV (TLV 10). This old CurrentKeyID can be removed or its use discontinued after all reachable nodes make the CurrentKeyID=MostRecentKeyID (to allow slow transitioning nodes). This new TLV is applicable for the entire L1/area level keys or entire L2/domain keys that are encompassed by the scope of the LSP packets and SNPs, which use the same keys scoped for LSPs.

Figure 2:
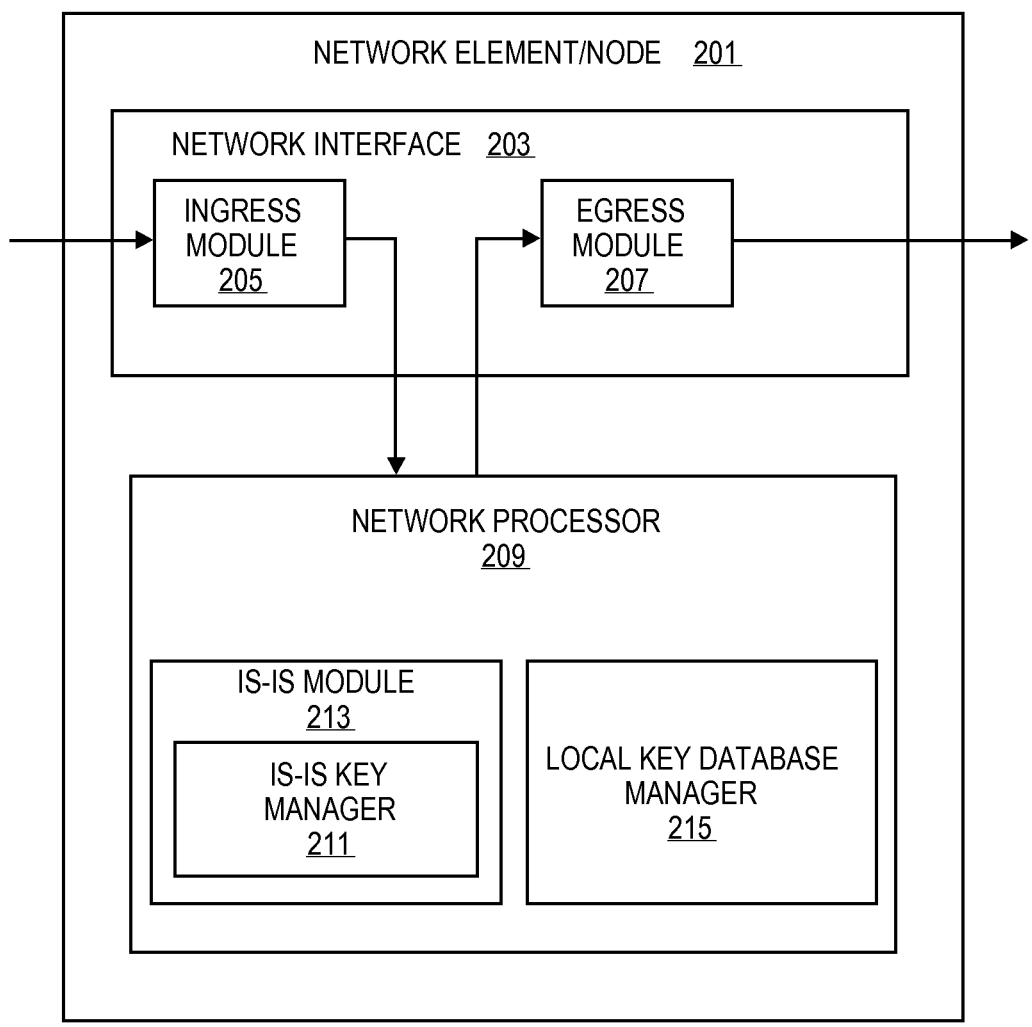
FIG. 2 is a diagram of one embodiment of a node in the network that implements a coordinated authentication key transition for IS-IS.

FIG. 2 is a diagram of one embodiment of a node in the network that implements a coordinated authentication key transition for IS-IS. In one embodiment, the network element 201 can be any type of networking device including a router or similar networking device that manages the forwarding of data traffic across a network between a source address and a destination address. The network element or node 201 can include a set of network interfaces 203 and network processors 209. A 'set,' as used herein refers to any positive whole number of items including one. The network interfaces 201 can include general purpose or dedicated circuitry for processing L1/L2/L3 data packet information and forwarding the data packets toward a destination node in the network. The network interfaces 203 can be implemented by line cards or can similar dedicated hardware in the network element 201. In some embodiments, the line cards communicate with one another over a switch fabric to forward incoming data packets from an ingress line card managing a port connected to a medium such as a fiber optical line or Ethernet line. The egress line card similarly, receives the data packet from the ingress line card and places the data packet on a port tied to a fiber optic or Ethernet line. The ingress and egress data processing circuitry can have any configuration and organization such that there is a set of ingress modules 205 and egress modules 207 to receive and send the data, respectively.

A network processor 209 can communicate with the ingress module 205 and egress modules 207 to assist in higher level data packet forwarding (e.g., L3 packet handling), or implement network policing, administration or similar policies. The network processors 209 can be placed in line cards or a main board of the network element in communication with line cards or similar ingress modules 205 and egress modules 207. In one embodiment, the network processors 209 can implement a local key database manager 215 and an IS-IS module 213. The local key database manager 215 can receive key change information via any type of messaging from the key management server or can provide a user interface for the manual update of the key or key chain utilized by the node 201. The local key database manager 215 can notify the IS-IS module 213 of changes to the authentication keys, specifically changes to the most recent key identifier. The local key database manager 215 generally manages the cryptographic keys for the node including other processes of the node.

In one embodiment, the network processor 209 implements an IS-IS module 213 that encompasses the full implementation of the IS-IS protocol or any subset of the IS-IS protocol. When the local key database manager 215 receives a key change and notifies the IS-IS module 213, the IS-IS module can generate IIH messages, or LSP/SNP fragments that advertise the most recent authentication key that has been received as well as to convey the most recent authentication key that is advertised by other nodes in the network to the key management module 211. In one embodiment, this advertisement process and the key transition management is implemented in an IS-IS key manager 211 within the IS-IS module. The IS-IS key manager 211 can track the current authentication key and the authentication keys known to be utilized or advertised by the reachable nodes in a network, an IS-IS area or domain. The IS-IS key manager 211 can operate in conjunction with the IS-IS module 213 to also generate messages sent to reachable nodes that include the MostRecentKeyId TLV or similar indicator of a most recent key received by the network element or node 201. The IS-IS key manager 211 can also implement the timer function and alert notification functions described herein.

The IS-IS module 213 and IS-IS key manager 211 can be separately or jointly implemented in software, firmware or hardware as components of the network processor 209 or as code executed by the network processors 209. Where there are multiple network processors 209, the functions of the IS-IS key manager 211 and IS-IS module 213 can be divided and sub-divided in any manner between the network processors 209. While illustrated as a subcomponent module in FIG. 2, the IS-IS key manager 211 can be an independent or separate component from the IS-IS module 213 for example by being implemented as a set of methods or functions and corresponding data structures in a library or similarly separate software or firmware distinct from the software or firmware of the IS-IS module 213.

In some embodiment the IS-IS key manager 211 includes a time-out module that is configured to start a time out counter in response to receiving the most recent key identifier from the group key management server, and configured to generate a notification of a failure of a node to transition in response to expiration of the counter without verification of all reachable nodes advertising the most recent key identifier. The IS-IS key manager 211 can count a reachable node as verified in response to receiving a message including the most recent key identifier. In some embodiments, the IS-IS key manager 211 can advertise by sending an IS-IS hello message containing the most recent key field in a type length value (TLV). The local key database manager 215 can remove the current key identifier in response to the IS-IS module 213 switching authentication to use the most recent key identifier. In other embodiments, the IS-IS key manager 211 advertises by sending a Sequence Number Packet (SNP) message including the most recent key field in a type length value (TLV). In further embodiments, the IS-IS module is configured to generate a link state protocol (LSP)-0 with a new sequence number including the most recent key field in a type length value (TLV).

Figure 3:
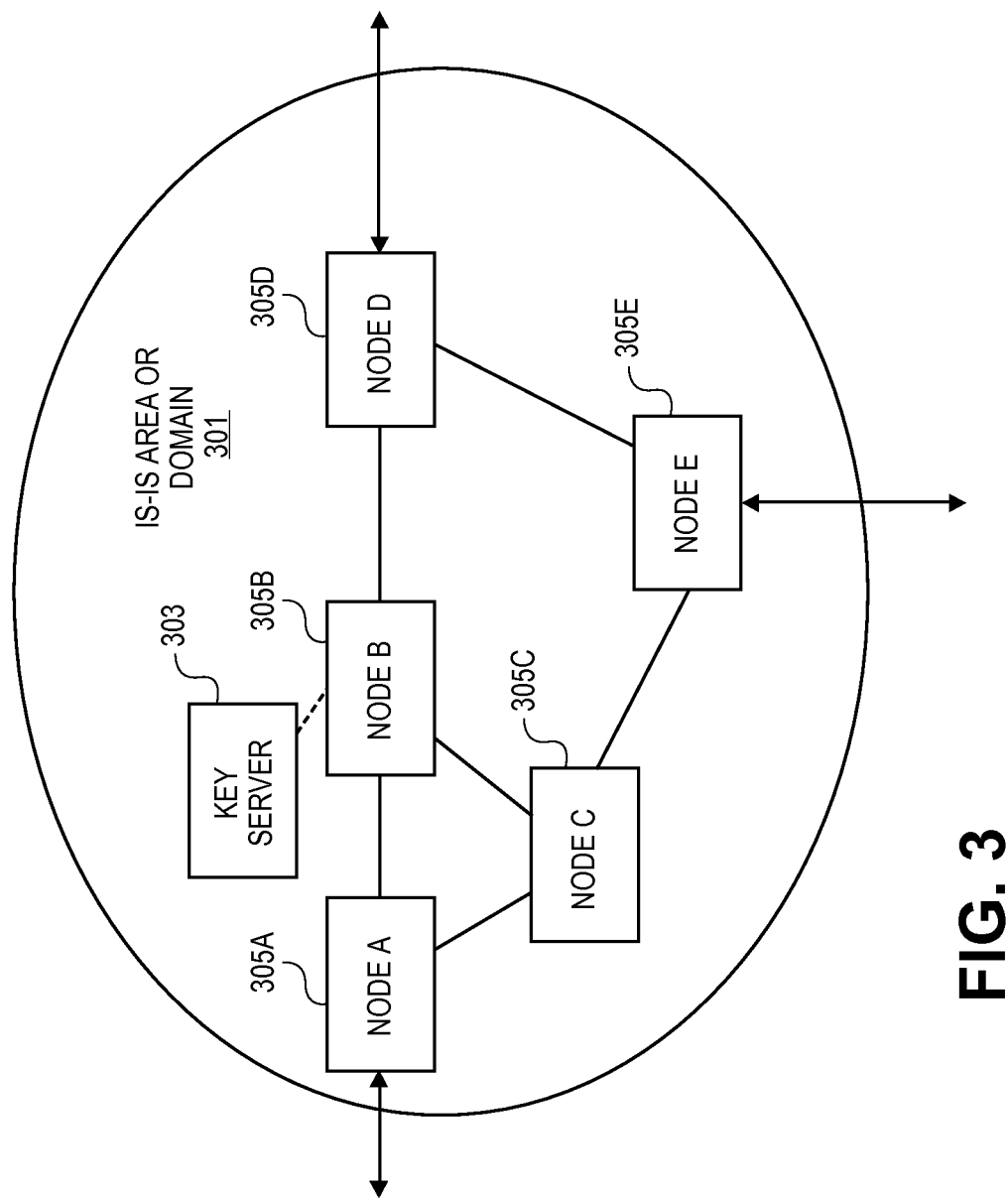
FIG. 3 is a diagram of one embodiment of a network of nodes that implement the coordinated authentication key transition for IS-IS.

FIG. 3 is a diagram of one embodiment of a network of nodes that implement the coordinated authentication key transition for IS-IS. Each of the nodes 305A-E can implement an IS-IS module and IS-IS key manager as described herein that implement the functions described in relation to FIG. 2. These nodes 305A-C can be any type of network elements and can be in communication with one another over any number (e.g., broadcast or point-to-point) and configuration of individual links including Ethernet, fiber optic and similar networking mediums. The group of nodes 301 that is managed by this key transition process can be an IS-IS L1 area, L2 domain, or similar configuration of related nodes that are configured to communicate using IS-IS with authentication.

A key management server 303 can be a separate server connected to the set of nodes of 301. In other embodiments, the key management server 303 can be integrated with the any of the nodes 305A-E or distributed over multiple servers or nodes. The key management server 303 can be outside the group 301 and connected by any number of intermediate nodes or devices to the group 301 or any of the nodes 305A-E of the group.

The group 301 can include any number of nodes 305A-E and related devices. The group can interface with any number of external networks or devices, such as nodes A, D, and E in the example illustration. The group 301 can have any internal organization or set of interconnections. In some embodiments, some of the nodes in the group 301 are not fully compliant with the automated authentication key transition process and the timer and alternate verification processes can be utilized to ensure proper automated key transition. Any number or configuration of the nodes can implement the automated key transition process.

The operations of the flow diagrams have been described with reference to the exemplary embodiment of the block diagrams. However, it should be understood that the operations of the flowcharts can be performed by embodiments of the invention other than those discussed, and the embodiments discussed with reference to block diagrams can perform operations different than those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

As described herein, operations performed by the sensor devices, synchronization and synthesis services may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An automated key transition method executed by a node in a network, the network including a set of nodes that are directly and indirectly interconnected, reachable and utilizing a current key identifier, a key identifier specifies an authentication protocol and an authentication key for use in the authentication of intermediate-system to intermediate-system (IS-IS) protocol data units within an IS-IS network, area or domain, the method including a set of steps comprising:

receiving a message at the node, the message having a most recent key field to hold a most recent key identifier, the message indicating to replace the current key identifier with the most recent key identifier;

advertising receipt of the most recent key to all reachable nodes of the set of nodes;

verifying, by the node, whether all reachable nodes in the set of nodes have advertised the most recent key identifier;

continuing authentication using the current key identifier until all reachable nodes in the set of nodes have been verified to advertise the most recent key identifier; and switching authentication at the node to use the most recent key identifier upon verification that all reachable nodes in the set of nodes have advertised the most recent key identifier.

2. The automated key transition method of claim 1, further comprising the steps of:

starting a time out counter in response to receiving the most recent key identifier; and generating a notification of a failure of a node to transition in response to expiration of the counter without verification of all reachable nodes in the set of nodes advertising the most recent key identifier.

3. The automated key transition method of claim 1, further comprising the steps of:

counting a reachable node as verified in response to receiving a message including the most recent key identifier from the reachable node.

4. The automated key transition method of claim 1, wherein the advertising further comprises:

sending an IS-IS hello message containing the most recent key field in a type length value (TLV).

5. The automated key transition method of claim 1, further comprising the step of:

removing the current key identifier in response to switching authentication to use the most recent key identifier.

6. The automated key transition method of claim 1, further comprising:

advertising the most recent key identifier to all reachable nodes in the set of nodes; and sending a Sequence Number Packet (SNP) message including the most recent key field in a type length value (TLV).

7. The automated key transition method of claim 1, further comprising the step of:

generating a link state protocol (LSP)-0 with a new sequence number including the most recent key field in a type length value (TLV).

8. A node configured to execute an automated key transition method for a network, the network including a set of nodes that are directly and indirectly interconnected, reachable and utilizing a current key identifier, a key identifier specifies an authentication protocol and an authentication key for use in the authentication of intermediate-system to intermediate-system (IS-IS) protocol data units within an IS-IS network, area, or domain, the node comprising:

a network interface for sending and receiving IS-IS messages to the set of nodes via adjacent nodes in the network; and a network processor coupled to the network interface, the network processor configured to execute a local key database manager and an IS-IS module, the local key database manager configured to receive a message having a most recent key field to hold a most recent key identifier, the message indicating to replace the current key identifier with the most recent key identifier, the IS-IS module including an IS-IS key manager that is configured to continue authentication using the current key identifier until all reachable nodes in the set of nodes have been verified to advertise the most recent key identifier, to advertise receipt of the most recent key to all reachable nodes of the set of nodes, to verify whether all reachable nodes in the set of nodes have advertised the most recent key identifier, and to switch authentication to use the most recent key identifier upon verification that all reachable nodes in the set of nodes have advertised the most recent key identifier.

9. The node of claim 8, wherein the IS-IS key manager further comprises:

a time-out module coupled to or executed by the network processor, the time-out module is configured to start a time out counter in response to receiving the most recent key identifier, and configured to generate a notification of a failure of a node to transition in response to expiration of the counter without verification of all reachable nodes in the set of nodes advertising the most recent key identifier.

10. The node of claim 8, wherein the IS-IS key manager is further configured to count a reachable node as verified in response to receiving a message including the most recent key identifier from the reachable node.

11. The node of claim 8, wherein the IS-IS key manager is further configured to advertise by sending an IS-IS hello message containing the most recent key field in a type length value (TLV).

12. The node of claim 8, wherein the local key database manager is further configured to remove the current key identifier in response to the IS-IS module switching authentication to use the most recent key identifier.

13. The node of claim 8, wherein the IS-IS key manager is further configured to advertise the most recent key identifier to all reachable nodes in the set of nodes by sending a Sequence Number Packet (SNP) message including the most recent key field in a type length value (TLV).

14. The node of claim 8, wherein the IS-IS key manager is further configured to generate a link state protocol (LSP)-0 with a new sequence number including the most recent key field in a type length value (TLV).

* * * * *